United States Patent Office 3,784,543
Patented Jan. 8, 1974

3,784,543
4-[N-(5-NITRO-2-THIAZOLYL)-FORMIMIDOYL]-THIOMORPHOLINES AND OXIDES
Atso Ilvespaa, Neu-Allschwill, Switzerland, assignor to Ciba-Geigy Corporation, Ardsley, N.Y.
No Drawing. Continuation-in-part of abandoned application Ser. No. 881,637, Dec. 2, 1969. This application June 9, 1971, Ser. No. 151,572
Claims priority, application Germany, Oct. 28, 1970, P 20 52 990.2
Int. Cl. C07d 91/34
U.S. Cl. 260—240 G          10 Claims

ABSTRACT OF THE DISCLOSURE

Compounds of the formula

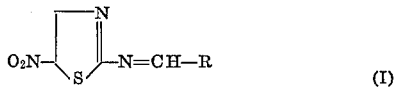

(I)

in which R represents a thiomorpholino residue which is substituted at at least one carbon atom and/or is oxidized at the sulfur atom, and their salts are useful as antiparasitary and antibacterial agents.

CROSS-REFERENCE TO OTHER APPLICATIONS

This application is a continuation-in-part of my copending application Ser. No. 881,637, filed Dec. 2, 1969, and now abandoned.

SUMMARY OF THE INVENTION

The present invention relates to new 4-[N-(5-nitro-2-thiazolyl) - formimidoyl] - thiomorpholines and oxides thereof. Especially it concerns compounds of the formula

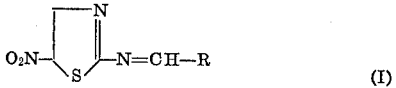

(I)

in which R represents a thiomorpholino residue which is substituted at at least one carbon atom and/or is oxidized at the sulfur atom and their salts, as well as pharmaceutical preparations containing these compounds and a process for treating infections and combating parasites which consists in administering such pharmaceutical preparations to a warm blooded being.

Thiomorpholino residues oxidized at the sulfur atom are S-mono-oxidized and S,S-dioxidized thiomorpholino residues.

Examples of suitable substituents are optionally substituted aliphatic hydrocarbon residues. Aliphatic hydrocarbon residues are more especially alkyl and alkenyl residues.

Alkyl residues are more especially lower alkyls such as methyl, ethyl, propyl or isopropyl, or linear or branched butyl, pentyl or hexyl residues which may be linked in any desired position. Alkenyl residues are in the first place lower alkenyl residues, for example allyl, methallyl, crotyl or 3-butenyl residues.

As substituents of the aliphatic hydrocarbon residues there may be mentioned primarily alkoxy groups. These are in the first place lower alkoxy groups, for example lower alkoxy groups derived from the lower alkyl groups indicated above. The alkyl residues substituted by lower alkoxy groups, that is to say, oxaalkyl residues are preferably lower alkoxy-lower alkyl residues, such as methoxymethyl, ethoxymethyl, n-propoxymethyl or n-butoxymethyl or -ethyl residues.

Said substituents of the thiomorpholine ring that are characterized as "lower" are preferably such as contain not more than 6 carbon atoms.

The new compounds possess valuable pharmacological properties; inter alia, they display an amoebicidal action, as can be shown by animal experiments, for example on oral administration of a dose of 100 to 200 mg./kg. to hamsters infected with E. histolytica. Furthermore, they act against Schistosomae, especially S. mansoni and S. japonicum, as can be shown in experiments on mice and hamsters infected with Schistosomae, for example on oral or subcutaneous administration of 100 mg./kg. The new compounds, therefore, are useful as anti-parasitary agents, especially as chemotherapeutics against Schistosomae and amoebal infections. The new compounds have also antibacterial activity, especially against gram-negative bacteria, for example Salmonellae. Accordingly, the new compounds are useful as antibacterial agents, too. The new compounds are also valuable intermediates for the manufacture of other useful substances, especially of pharmacologically active compounds.

Specially valuable are compounds of the formulae

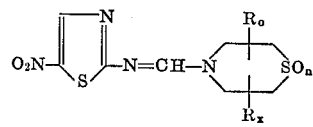

and

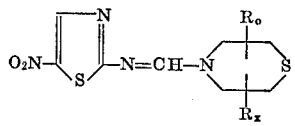

in which $n=1$ or 2 and $R_o$ and $R_x$ each represents a lower alkyl residue, especially a methyl residue, or a lower alkoxy-alkyl residue, in the first place a methoxymethyl residue, and the residue $R_x$ may also represent hydrogen, and in the first place the compounds of the formulae

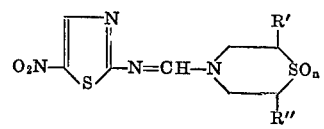

and

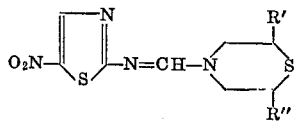

in which $n=1$ or 2, and R' and R'' each represents a lower alkyl residue, for example a methyl residue.

Of special value are 4-[N-(5-nitro-2-thiazolyl)-formimidoyl]-thiomorpholine-1,1-dioxide of the formula

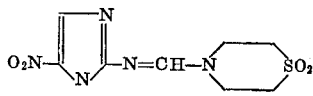

3-(methoxymethyl) - 4 - [N-(5-nitro - 2 - thiazolyl)-formimidoyl]-thiomorpholine-1,1-dioxide of the formula

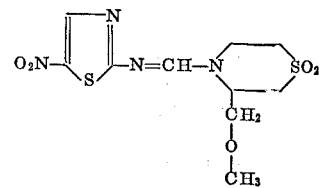

cis-2,6-dimethyl-4-[N-(5 - nitro - 2 - thiazolyl)-formimidoyl]-thiomorpholine-1,1-dioxide of the formula

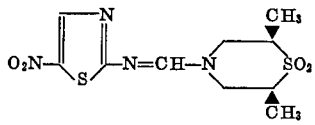

and more especially cis-2,6-dimethyl-4-[N-(5-nitro-2-thiazolyl)-formimidoyl]-thiomorpholine of the formula

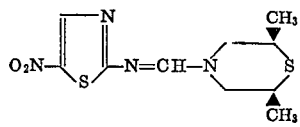

which, for example in mice and hamsters infected with S. mansoni, displays a distinct schistosomicidal action on oral or subcutaneous administration of 100 mg./kg.

The new compounds are manufactured by methods known per se. Thus, for example, an amine of the formula HR is reacted with a compound of the formula

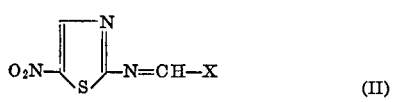

R having the meaning given above and X standing for an alkoxy group or a dialkylamino group.

An alkoxy group is, for example a lower alkoxy group such as an ethoxy or methoxy group; a dialkylamino group is, for example a di-lower alkylamino group, such as the dimethylamino group.

Another process for the production of the new compounds consists in reacting 2-amino-5-nitrothiazole with a compound of the formula R—CO—Cl, in which R has the meaning indicated, in dimethylformamide. In this operation, an N,N-dimethyl-formamidinium chloride is formed intermediately, the N'-nitrogen atom of which belongs to the residue R, and which then reacts further with the 2-amino-5-nitro-thiazole.

The new compounds are also obtained when 2-amino-5-nitrothiazole is reacted with an acetal of a formamide of the formula HCOR in which R has the meaning indicated. Specially suitable acetals are those in which the alcohol component is a lower alkanol, for example the dimethylacetal of a formamide of the formula HCOR.

A suitable process for producing the mono- and dioxide of 4-[N-(5-nitro-2-thiazolyl)-formimidoyl]-thiomorpholine consists in oxidizing the non-oxidized compound. The oxidation can be carried out in known manner, for example by reaction with a peracid, especially peracetic acid, a perbenzoic acid or monoperphthalic acid which may be substituted, for example by halogen atoms. When this reaction is carried out at a low temperature, that is to say with good cooling, or when only one mol equivalent of the oxidant is used, the monoxides are obtained, while heating and/or use of at least 2 mol equivalents of oxidant gives the dioxides.

Resulting unoxidized compounds can be converted into the S-monoxides or S,S-dioxides, and resulting S-monoxides into S,S-dioxides. These oxidations can be carried out in the manner described above.

The above-mentioned reactions can be carried out in the usual manner in the presence or absence of diluents and/or catalysts, at room temperature or with heating or cooling, if desired under superatmospheric pressure and/or under an inert gas.

Depending on the starting materials and reaction conditions used the final products are obtained in the free form or in form of their salts, which are likewise included in the present invention. The salts of the final products can be converted into the free bases in known manner, for example with alkalies or ion exchange resins. When the bases are reacted with strong organic or inorganic acids, especially those which are capable of forming therapeutically acceptable salts, they yield salts. As such acids there may be mentioned, for example, hydrohalic, sulfuric or phosphoric acids, nitric or perchloric acid; aliphatic or aromatic sulfonic acids such as methanesulfonic, ethanesulfonic, hydroxyethanesulfonic, ethylenesulfonic acid; halobenzenesulfonic, toluenesulfonic or naphthalenesulfonic acids.

These or other salts of the new compounds, for example their picrates, may also be used for purifying the resulting bases by converting the base into salts, isolating the salts and separating the bases again from the salts. In view of the close relationship between the bases in free form and in form of their salts what has been said above and hereinafter with reference to the bases concerns also the corresponding salts wherever this is possible and useful.

The invention includes also any variant of the present process in which an intermediate obtainable at any stage of the process is used as starting material and any remaining process step(s) is/are carried out or in which a starting material is formed under the reaction conditions or is used in the form of a salt and/or isomer or racemate mixture or of their constituents.

Thus, for example, in the first-named process the iminoethers of the N-formyl compounds may be formed in situ; for example, it is possible to react 2-amino-5-nitrothiazole with orthoformic acid triethyl ester and to allow the N-(5-nitro-2-thiazolyl)-formic acid-iminoether formed as intermediate product to react with an amine of the formula H-R, in which R has the meaning indicated, to obtain the desired end product.

Depending on the degree of substitution in the thiomorpholine ring the new compounds may be in the form of cis- and trans-isomers or possibly of racemates or optical antipodes. The resulting racemates or isomer mixtures can, if desired, be resolved in the usual manner.

Mixtures of isomers or racemates can be resolved on the basis of the physico-chemical differences of the constituents in known manner into the pure isomers or pure racemates, for example by chromatography and/or fractional crystallization.

Pure racemates can likewise be resolved into the optical antipodes by known methods, for example by recrystallization from an optically active solvent, or with the aid of microorganisms, or by reaction with an optically active acid capable of forming salts with the racemic compound and separation of the salts thus obtained, for example on the basis of their different solubilities, to form the diastereomers from which the antipodes can be liberated by treatment with suitable agents. Particularly frequently used optically active acids are, for example, the D- and L-forms of camphorsulfonic acid. Preferably, the more active of the constituents is isolated.

The final products of this invention may also be obtained in the form of the cis- or trans-isomers, racemates or optical antipodes, when the starting materials containing the substituted thiomorpholine ring are used in form of the cis- or trans-isomers, racemates or optical antipodes respectively.

The reactions of this invention are preferably performed with the use of starting materials that give rise to the preferred compounds mentioned above.

The starting materials are known or can be obtained by known methods. 4-[N-(5-nitro-2-thiazoly)-formimidoyl]-thiomorpholine which is the starting material for the corresponding S-monoxide and S,S-dioxide can be prepared as described in Example 5. The compound also possesses valuable pharmacological properties; thus, it acts against Schistosomae, especially S. mansoni, as can be shown in experiments on mice infected with Schistosomae, for example on repeated subcutaneous administration of 15–45 mg./kg., and in experiments on hamsters infected with Schistosomae, for example on intramuscular administration of a single dose of 50–110 mg./kg. The compound is also active against S. japonicum, as can be shown in animal experiments, for example on infected hamsters on administration of a single dose of 130–360 mg./kg. i.m. The compound also has an amoebicidal action, as can be shown in animal experiments, for example on hamsters having an hepatic abscess caused by E. hystolytica, on oral administration of 100 mg./kg. 4-[N-(5-nitro-2-thiazolyl) - formimidoyl] - thiomorpholine therefore is useful as an anti-parasitary agent, especially as a chemotherapeutic against schistosomal and amoebal infections.

4-[N-(5-nitro - 2-thiazolyl) - formimidoyl]-thiomorpholine may be obtained in the free form or in the form of a salt, especially a therapeutically acceptable acid addition salt, such as a salt with one of the acids described above. What has been said above with respect to the salts of the compounds defined at the beginning of this specification, the conversion of these salts into the free bases and vice versa, use of these salts for purification and the like, applies as well to the salts of 4-[N-(5-nitro-2-thiazolyl)-formimidoyl]-thiomorpholine. 4-[N-(5-nitro-2-thiazolyl)-formimidoyl]-thiomorpholine and its salts also form part of this invention.

The new compounds can be used as medicaments in the form of pharmaceutical preparations which contain the new compounds in the free form or in form of their salts, especially the therapeutically useful acid addition salts, in admixture or conjunction with organic or inorganic, solid or liquid pharmaceutical excipients suitable for enteral, for example oral, or parenteral administration.

Suitable excipients are substances that do not react with the new compounds, for example water, gelatin, lactose, starches, stearyl alcohol, magnesium stearate, talcum, vegetable oils, benzyl alcohols, gums, polyalkylene glycols, white petroleum jelly, cholesterol or other known medicinal excipients. The pharmaceutical preparations may be, for example, tablets, dragees, capsules or suppositories, or in liquid form solutions (for example elixirs or syrups), suspensions or emulsions. They may be sterilized and/or contain assistants such a preserving, stabilizing, wetting or emulsifying agents, solution promoters, salts for regulating the osmotic pressure or buffers. They may also contain further, therapeutically valuable substances. The preparations are formulated by conventional methods.

The following examples illustrate the invention.

EXAMPLE 1

A solution of 14.5 g. of 2-amino-5-nitro-thiazole in 300 ml. of absolute dioxan is added to a solution of 23.3 g. of 2,6 - cis - dimethyl - 4 - formyl-thiomorpholine-diethylacetal in 50 ml. of absolute dioxan. The mixture is thereafter boiled for 3 hours under reflux and the clear solution is then evaporated in vacuo. The evaporation residue is first recrystallized from 150 ml. of methanol and then again from 70 ml. of isopropanol. The 2,6-cis-dimethyl-4-[N-(5-nitro-2-thiazolyl)-formimidoyl]-thiomorpholine of formula

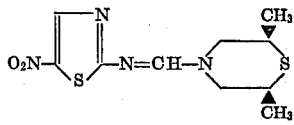

having a melting point of 116–117° C. is thus obtained.

The 2,6 - cis-dimethyl-4-formyl-thiomorpholine-diethylacetal used as the starting material can be manufactured as follows:

131 g. of cis-2,6-dimethyl-thiomorpholine and 200 g. of dimethylformamide-diethylacetal are stirred for 3 hours at an oil bath temperature of about 140° C. About 50 ml. of low-boiling constituents distill off during the first hour. After 3 hours' stirring the reaction mixture is subjected to a fractional distillation. The 2,6 - cis-dimethyl-4-formyl-thiomorpholine-diethylacetal of boiling point 112–117° C./8 mm. Hg is thus obtained.

EXAMPLE 2

14.5 g. of 2-amino-5-nitro-thiazole, 28.2 g. of cis-2,6-dimethyl-thiomorpholine-4-carboxylic acid chloride and 100 ml. of absolute dimethylformamide are boiled for 1 hour under reflux. The reaction mixture is subsequently evaporated to dryness in vacuo (finally at about 0.1 mm. Hg). The evaporation residue is first triturated with 60 ml. of methanol and the solid product thus obtained is then chromatographed on a 35-fold quantity of silica gel. Elution is carried out with a toluene-chloroform mixture (10:1). The homogeneity of the resulting fractions is controlled by means of thin layer chromatography. The fractions having an $R_f$ value of about 0.6 (system: chloroform-acetone, 4:1) are combined and recrystallized from 35 ml. of isopropanol.

The 2,6-cis-dimethyl - 4 - [N - (5-nitro-2-thiazolyl)-formimidoyl]-thiomorpholine of melting point 116–117° C., which is identical with the product obtained in Example 1, is thus obtained.

The cis - 2,6 - dimethyl-thiomorpholine-4-carboxylic acid chloride used as the starting material can be manufactured from cis-2,6-dimethyl-thiomorpholine and phosgene. It represents a water-clear oil of boiling point 90–93° C./0.35 mm. Hg.

EXAMPLE 3

A solution of 1.0 g. of N,N - dimethyl - N' - (5-nitro-2-thiazolyl)-formamidine and 1.3 g. of cis-2,6-dimethyl-thiomorpholine in 30 ml. of dimethylformamide is boiled for 1 hour under reflux. The reaction mixture is thereafter evaporated to dryness in vacuo (finally about 0.1 mm. Hg) and the evaporation residue is chromatographed on a 50-fold quantity of silica gel. Elution is carried out with a toluene-chloroform mixture (10:1). The homogeneity of the resulting fractions is checked by means of thin layer chromatography. The fractions having an $R_f$ value of about 0.6 (system: chloroform-acetone, 4:1) are combined and recrystallized from isopropanol. The 2,6-cis-dimethyl - 4 - [N - (5 - nitro-2-thiazolyl)-formimidyl]-thiomorpholine of melting point 116–117° C. (after two recrystallizations from isopropanol) which is identical with the products obtained in Examples 1 and 2, is thus obtained.

EXAMPLE 4

A solution of 9.0 g. of m-chloroperbenzoic acid of 85% strength in 250 ml. of methylenechloride is stirred within 30 minutes at 20 to 25° C. dropwise into a solution of 5.7 g. of cis - 2,6 - dimethyl - 4 - [N-(5-nitro-2-thiazolyl)-formimidoyl]-thiomorpholine in 100 ml. of methylenechloride. The batch is then stirred for 3 hours at room temperature and the clear reaction mixture is agitated with 100 and then with 2× 50 ml. of 0.5 N aqueous sodium hydrogencarbonate solution and finally with 2× 50 ml. of water. The methylene chloride solution is dried with anhydrous magnesium sulphate and evaporated. The residue is recrystallized from 75 ml. of 2-ethoxyethanol, to yield cis - 2,6 - dimethyl - 4 - [N - (5-nitro-2-thiazolyl)-formimidoyl]-thiomorpholine-1,1-dioxide of the formula

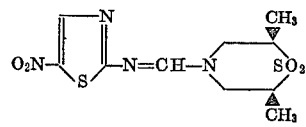

melting at 228–229° C.

EXAMPLE 5

A solution of 10.0 g. of m - chloro - perbenzoic acid in 300 ml. of methylene chloride is added dropwise, while stirring at 20–25° C. to a solution of 12.9 g. of 4-[N-(5-nitro - 2 - thiazolyl) - formimidoyl]-thiomorpholine in 250 ml. of methylene chloride. The reaction mixture is stirred overnight at room temperature and then agitated with 150 ml. of N-aqueous sodium bicarbonate solution. The solid product formed as a suspension is filtered off with suction, washed and dried. 4 - [N - (5 - nitro-2-thiazolyl)-formimidoyl]-thiomorpholine-1-oxide of the formula

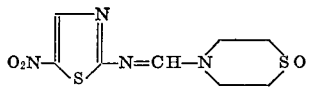

melting at 259° C. (with decomposition) is obtained.

The 4 - [N - (5 - nitro - 2 - thiazolyl)-formimidoyl]-thiomorpholine used as starting material can be prepared as follows:

100.8 g. of thiomorpholine and 150 g. of dimethylformamide-dimethyl acetal are stirred for 4 hours, the temperature of the oil bath being gradually raised from 120 to 150° C. During the first hour, 110 ml. of low-boiling constituents distill over. When the reaction mixture has been stirred for 4 hours it is subjected to fractional distillation. 4 - formyl - thiomorpholine - dimethylacetal is obtained which boils at 111–116° C. under a pressure of 15 mm. of Hg.

A solution of 47.0 g. of 2 - amino - 5 - nitro-thiazole in 1000 ml. of absolute dioxan is added to a solution of 57.2 g. of 4 - formlylthiomorpholine - dimethylacetal in 100 ml. of absolute dioxan. The reaction mixture is then boiled for 3 hours under reflux and the solution evaporated. The residue is recrystallized first from 350 ml. of toluene and then from 250 ml. of 2-ethoxyethanol, to yield 4 - [N - (5-nitro-2-thiazolyl)-formimidoyl]-thiomorpholine of the formula

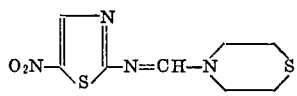

melting at 168–170° C.

EXAMPLE 6

A solution of 12.9 g. of 4 - [N - (5 - nitro-2-thiazolyl)-formimidoyl]-thiomorpholine in 250 ml. of methylene chloride is added dropwise at 17–32° C. in the course of 10 minutes to a solution of 25 g. of m-chloro-perbenzoic acid in 500 ml. of methylene chloride. The mixture is then stirred at room temperature for 3 hours, after which the excess peracid is destroyed by the dropwise addition of sodium meta-bisulfite, and the reaction mixture is then extracted with 300 ml. of N-aqueous sodium bicarbone solution, and filtered with suction and the filter residue is washed and dried. The resulting crude product is recrystallized from 75 ml. of dimethylformamide, then again from 40 ml. of dimethylformamide, and 4-[N-(5-nitro-2-thiazolyl)-formimidoyl]-thiomorpholine-1,1 - dioxide of the formula

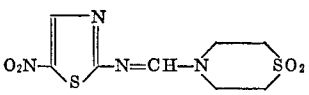

melting at 267° C. (with decomposition) obtained.

EXAMPLE 7

14.5 g. of 2 - amino - 5 - nitro-thiazole and 75 ml. of orthoformic acid triethyl ester are stirred for 2 hours at an external temperature (oil bath) of 120° C. The resulting alcohol is at the same time distilled off. When the reaction mixture has cooled somewhat, it is treated with 13.1 g. of cis - 2,6 - dimethyl - thiomorpholine, and stirred for another 2 hours at 100° C. The reaction mixture is then evaporated to dryness in a rotary evaporator, the residue triturated with methanol, and then recrystallized from 110 ml. of isopropanol. Pure cis - 2,6 - dimethyl - (4 - [N- (5 - nitro - 2 - thiazolyl) - formimidoyl]-thiomorpholine melting at 116–117° C. is thus obtained which is identical with the product obtained according to Example 1.

EXAMPLE 8

A mixture of 14.5 g. of 2 - amino - 5 - nitrothiazole and 75 ml. of orthoformic acid triethyl ester is stirred for 2 hours at an oil bath temperature of about 120° C., while distilling off the ethanol which forms. The reaction mixture is allowed to cool somewhat before a solution of 17.9 g. of 3 - methoxymethyl - thiomorpholine-1,1-dioxide in 25 ml. of orthoformic acid triethyl ester is added. The mixture is stirred for 5 to 10 minutes at an oil bath temperature of 100° C., the product crystallizing out. The batch is filtered with suction, then recrystallized from 500 ml. of 2 - ethoxy - ethanol, then from 420 ml. of 2-ethoxy-ethanol. 3-(methoxymethyl) - 4 - [N-(5-nitro-2-thiazolyl)-formimidoyl]-thiomorpholine-1,1 - dioxide of the formula

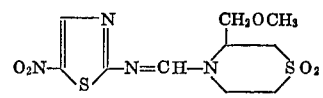

melting at 227–228° C. is obtained.

The 3 - (methoxymethyl) - thiomorpholine-1,1-dioxide used as starting material can be prepared for example by condensing 3 - (methoxymethyl)-thioxan-1,1-dioxide with ammonia.

EXAMPLE 9

Tablets containing 500 mg. of cis-2,6-dimethyl-4-[N-(5-nitro - 2 - thiazolyl) - formimidoyl]-thiomorpholine may be prepared with the following ingredients:

| | Per tablet, mg. |
|---|---|
| Cis - 2,6 - dimethyl - 4 - [N-(5-nitro-2-thiazolyl)-formimidoyl]-thiomorpholine | 500.0 |
| Wheat starch | 70.0 |
| Colloidal silicic acid with hydrolyzed starch | 30.0 |
| Magnesium stearate | 6.0 |
| Talc | 19.0 |
| | 625.0 |

Method

Half of the wheat starch is pasted with four times the quantity of water on a water-bath. The active substance is kneaded with the paste to form a plastic mass. The colloidal silicic acid with hydrolyzed starch is then worked in portions. The plastic mass is passed through a sieve having a 4–5 mm. mesh and dried at 45° C. The dried granulate is passed through a sieve of 0.8–1.4 mm. mesh and the remaining disintegrating and lubrication agents are then added. After further homogenization tablets having a diameter of 11.5 mm. and weighing 625 mg. are compressed in the conventional manner.

EXAMPLE 10

In an analogous manner to that described in Examples 1–8 the following compounds can be prepared:

2-ethyl-4-[N-(5-nitro-2-thiazolyl)-formimidoyl]-thiomorpholine-1-oxide,
3-n-propyl-4-[N-(5-nitro-2-thiazolyl)-formimidoyl]-thiomorpholine,
3-allyl-4-[N-(5-nitro-2-thiazolyl)-formimidoyl]-thiomorpholine-1,1-dioxide,
2,5-dimethyl-4-[N-(5-nitro-2-thiazolyl)-formimidoyl]-thiomorpholine,
3,5-dimethyl-4-[N-(5-nitro-2-thiazolyl)-formimidoyl]-thiomorpholine,
3-propoxymethyl-5-ethyl-4-[N-(5-nitro-2-thiazolyl)-formimidoyl]-thiomorpholine-1,1-dioxide,
3,5-bis-(butoxymethyl)-4-[N-(5-nitro-2-thiazolyl)-formimidoyl]-thiomorpholine-1,1-dioxide,
2-methoxyethyl-6-isopropyl-4-[N-(5-nitro-2-thiazolyl)-formimidoyl]-thiomorpholine-1,1-dioxide, 2,3,5,6-tetramethyl-4-[N-(5-nitro-2-thiazolyl)-form-
imidoyl]-thiomorpholine-1-oxide and
2,3,6-trimethyl-5-methoxymethyl-4-[N-(5-nitro-2-
thiazolyl)-formimidoyl]-thiomorpholine.

What is claimed is:
1. A member selected from the group consisting of compounds of the formula

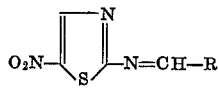

in which R stand for a member selected from the group consisting of thiomorpholino substituted by a member selected from the group consisting of lower alkyl, lower alkenyl and lower alkoxy-lower alkyl, S-mono-oxidized thiomorpholino, S-mono-oxidised thiomorpholino substituted by a member selected from the group consisting of lower alkyl, lower alkenyl and lower alkoxy-lower alkyl, S,S-dioxidized thiomorpholino and S,S-dioxidized thiomorpholino substituted by a member selected from the group consisting of lower alkyl, lower alkenyl and lower alkoxy-lower alkyl, and their therapeutically acceptable salts.

2. A compound as claimed in claim 1 in which R stands for a member selected from the group consisting of thiomorpholino monosubstituted by a member selected from the group consisting of lower alkyl and lower alkoxy-lower alkyl, thiomorpholino disubstituted by a member selected from the group consisting of lower alkyl and lower alkoxy-lower alkyl, S-mono-oxidized thiomorpholino, S-mono-oxidized thiomorpholino monosubstituted by a member selected from the group consisting of lower alkyl and lower alkoxy-lower alkyl, S-mono-oxidized thiomorpholino di-substituted by a member selected from the group consisting of lower alkyl and lower alkoxy-lower alkyl, S,S-di-oxidized thiomorpholino, S,S-di-oxidized thiomorpholino monosubstituted by a member selected from the group consisting of lower alkyl and lower alkoxy-lower alkyl and S,S-di-oxidized thiomorpholino disubstituted by a member selected from the group consisting of lower alkyl and lower alkoxy-lower alkyl.

3. A compound as claimed in claim 1 in which R stands for stands for a memeber selected from the group consisting of thiomorpholino 2,6 - disubstituted by lower alkyl, S-mono-oxidized thiomorpholino 2,6-disubstituted by lower alkyl and S,S-dioxidized thiomorpholino 2,6-disubstituted by lower alkyl.

4. A compound as claimed in claim 1, said compound being 2,6 - dimethyl - 4 - [N-(5-nitro-2-thiazolyl)-formimidoyl]-thiomorpholine or a therapeutically acceptable salt thereof.

5. A compound as claimed in claim 1, said compound being cis - 2,6 - dimethyl-4-[N-(5-nitro-2-thiazolyl)-formimidoyl]-thiomorpholine or a salt thereof.

6. A compound as claimed in claim 1, said compound being 4 - [N - (5 - nitro-2-thiazolyl)-formimidoyl]-thiomorpholine-1-oxide or a therapeutically acceptable salt thereof.

7. A compound as claimed in claim 1, said compound being 4 - [N - (5-nitro-2-thiazolyl)-formimidoyl]-thiomorpholine-1,1-dioxide or a therapeutically acceptable salt thereof.

8. A compound as claimed in claim 1, said compound being 2,6 - dimethyl - 4 - [N-(5-nitro-2-thiazolyl)-formimidoyl]-thiomorpholine-1,1-dioxide or a therapeutically acceptable salt thereof.

9. A compound as claimed in claim 1, said compound being 3 - methoxymethyl - 4 - [N-(5-nitro-2-thiazolyl)-formimidoyl]-thiomorpholine-1,1-dioxide or a therapeutically acceptable salt thereof.

10. 4 - [N -(5 - nitro-2-thiazolyl)-formimidoyl]-thiomorpholine and the therapeutically acceptable salts thereof.

References Cited
UNITED STATES PATENTS

| | | | |
|---|---|---|---|
| 3,318,904 | 5/1964 | Schmidt et al. | 260—240 G X |
| 3,483,209 | 12/1969 | Mizzoni et al. | 260—243 B X |
| 3,488,348 | 1/1970 | Mayer et al. | 260—240 A |
| 3,505,320 | 4/1970 | Dabritz et al. | 260—243 R |
| 3,530,124 | 9/1970 | Ilvespaa | 260—243 R |

FOREIGN PATENTS

| | | | |
|---|---|---|---|
| 992,166 | 5/1965 | England | 260—240 A |

JOHN D. RANDOLPH, Primary Examiner

U.S. Cl. X.R.
424—246; 260— 243 B; 243 R, 306.8